United States Patent [19]

Kobinata et al.

[11] 3,873,468

[45] Mar. 25, 1975

[54] METHOD OF REMOVING SUBSTANCE HARMFUL TO OXIDATION REACTION IN THE PRODUCTION OF BENZENECARBOXYLIC ACIDS BY OXIDATION

[75] Inventors: Sadao Kobinata, Ashiya; Takeo Satake; Naonobu Hiramoto, both of Yokkaichi, all of Japan

[73] Assignee: Kuraray Yuka Co., Ltd., Tokyo, Japan

[22] Filed: Nov. 30, 1971

[21] Appl. No.: 203,465

[30] Foreign Application Priority Data

Dec. 9, 1970 Japan.............................. 45-109780
Dec. 9, 1970 Japan.............................. 45-109781
Dec. 9, 1970 Japan.............................. 45-109782

[52] U.S. Cl.............. 252/413, 252/412, 260/524 R, 260/525, 423/144
[51] Int. Cl... B01t 11/02, C07c 63/02, C01g 45/00, C01g 51/00
[58] Field of Search................... 252/412, 413, 420; 260/525, 524 R

[56] References Cited
UNITED STATES PATENTS 2,964,559  12/1960  Burney et al. ...................... 260/525
3,105,851  10/1963  Knobloch et al. .................. 252/413
3,673,154  6/1972   Trevillyan ...................... 260/524 R

FOREIGN PATENTS OR APPLICATIONS 14,339  4/1971  Japan

OTHER PUBLICATIONS

Chemical Abstracts – Vol. 76 – 1972 – p. 358, 132073 e – "Recovery of Cobalt and Manganese Catalysts from P–Xylene Liquid Phase Oxidation Mixture," Obinata, et al.

Primary Examiner—Winston A. Douglas
Assistant Examiner—P. E. Konopka
Attorney, Agent, or Firm—Sherman & Shalloway

[57] ABSTRACT

In the production of benzene carboxylic acids by the oxidation of alkyl benzenes with molecular oxygen in the presence of a heavy metal oxidation catalyst, the catalyst is recovered as a residue contaminated by iron and tar-like by-products which act as inhibitors for the oxidation reaction and cannot be re-used as such. The catalyst is recovered in such a purity as re-usable by extracting the residue by water, regulating the pH of the aqueous phase to a value more than 5 but not exceeding 8 to thereby separate the tar-like products as an oily float and iron as precipitates and removing such oily float and precipitates from the aqueous phase.

6 Claims, No Drawings

METHOD OF REMOVING SUBSTANCE HARMFUL TO OXIDATION REACTION IN THE PRODUCTION OF BENZENECARBOXYLIC ACIDS BY OXIDATION

This invention relates to a method of removing contaminants harmful to an oxidation reaction from a residue occurring in the preparation of benzenecarboxylic acids by the liquid phase oxidation of alkylbenzenes, and to a method of recovering heavy metals used as an oxidation catalyst with high purity.

The residue mentioned above results from the recovery of solvent from the reaction mixture from which the formed benzenecarboxylic acids have been recovered (this may be referred to simply as the residue).

Known methods for producing benzenecarboxylic acids by the liquid phase oxidation of alkylbenzenes such as p-xylene, m-xylene, ethyl toluene, diisopropyl benzene or trimethylbenzene with a gas containing molecular oxygen (air for industrial-scale operation) using a heavy metal such as cobalt or manganese as a catalyst, preferably in the presence of a halogen especially bromine as a promotor are commercially advantageous, and phthalic acid, trimellitic acid, and pyromellitic acid can be carried out on a large scale. In this oxidation reaction, a lower aliphatic acid having 2 to 4 carbon atoms such as acetic acid is used as a solvent, and the heavy metal catalyst is generally used in the form of a salt, preferably in the form of a salt derived from the aliphatic acid used as the solvent. Since the benzenecarboxylic acids produced by these methods are difficultly soluble in the above-mentioned solvent, they can be separated from the oxidation reaction mixture by such conventional means as filtration or centrifugation.

The residue of the reaction mixture from which the benzenecarboxylic acid has been separated and then the solvent has been recovered by such means as distillation contains the oxidation catalyst, unchanged alkylbenzene, intermediate oxidation products, and oxidation by-products such as benzaldehydes, alkylbenzenecarboxylic acids and tar-like substances. Because the heavy metal oxidation catalysts are rather expensive and discarding of the heavy metals into rivers and sea causes pollution, it has been desired to recycle the heavy metals in the oxidation reaction or recover them in the form suitable for recycle. Proposals have been made for solving this problem including a method wherein the reaction mixture from which the benzenecarboxylic acid has been separated or the residue is returned directly to the reaction system, a method wherein the catalyst is extracted from the residue with water or a lower monocarboxylic acid (U.S. Pat. No. 2,964,559), a method wherein alkali is added to the residue, and the catalyst metal is separated as a hydroxide by filtration and is recycled in the form of a suspension in solvent (British Pat. No. 970,492), a method wherein the residue is treated with an organic solvent to recover the catalyst from the solid phase (Japanese Pat. No. 4820/65), or a method wherein the mother liquor is treated with an ion exchange resin to separate the catalyst metal (Japanese Pat. No. 4923/65).

In the above-mentioned oxidation reaction, a minor amount of iron (ions) enters the reaction system as an impurity or as a result of corrosion of the equipment. Since iron ions retard or inhibit the oxidation reaction, it is important to avoid the presence of iron when recovering or recycling the oxidation catalyst. Furthermore, the residue contains about 10 to 80%, based on organic materials, of (excluding unrecovered solvent) tar-like substances which are inevitably formed as by-products in the oxidation reaction. Since the tar-like by-products also act as inhibitors for the oxidation reaction, it is important to prevent the contamination with not only iron but also the tar-like by-products when the catalyst component is recovered from the residue for recycle. However, according to the above-mentioned methods of recycling or recovering the catalyst, the iron remains unremoved and is present together with the catalyst metal, and the tar-like by-products are also present in some amount. These contaminants are built up in the reaction system as a result of recycling the catalyst metal, and accordingly inhibit the oxidation reaction, which in turn results in a drastic decrease in the yield of the benzene carboxylic acids and finally in the stoppage of the reaction. When the heavy metal catalyst is extracted and recovered from the residue using water or a lower carboxylic acid, it has been proposed to subject the residue to the heat-treatment before the extraction in order to prevent the intrusion of tar-like substances (Japanese Pat. No. 18577/66). However, there have been no satisfactory methods for removing harmful iron and tar-like substances simultaneously, and recovering the heavy metal catalyst suitable for recycle.

It is an object of the present invention to provide a method of preventing the contamination with both iron and tar-like substances simultaneously in order to permit the recovery of the heavy metal catalyst completely suitable for recycle in the production of benzenecarboxylic acids by the liquid phase oxidation of alkylbenznes with a gas containing molecular oxygen using a saturated aliphatic monocarboxylic acid having 2 to 4 carbon atoms as a solvent in the presence of a heavy metal oxidation catalyst.

Another object of the present invention is to provide an advantageous method of recovering the heavy metal catalyst with high purity sufficient for re-use and with good efficiency and economy from the above-mentioned residue without accompanying substantial amount of the harmful tar-like substances.

According to the present invention, a method is provided for of removing iron and tar-like by-products from the residue containing a heavy metal oxidation catalyst, the residue being derived by separating the formed benzene carboxylic acid and then recovering a solvent from the reaction mixture from the liquid phase oxidation of an alkyl benzene with a molecular oxygen-containing gas using a heavy metal oxidation catalyst in the presence of a saturated lower aliphatic monocarboxylic acid having 2 to 4 carbon atoms as a solvent wherein the reaction mixture is contaminated by iron and tar-like oxidation by-products which act as inhibitors for the oxidation reaction, the method comprising the steps of: subjecting the residue to extraction with water; separating the catalyst-containing aqueous phase from the so-treated residue; regulating the pH of the aqueous phase to a value more than 5 but not exceeding 8 to thereby separate the tar-like by-products as an oily float and iron as a precipitate of basic iron carboxylate; and removing such oily float and precipitate from the aqueous phase.

The invention will be described in greater detail below.

The term "residue," used in the present specification and claims, means a tar-like or solid material which has been obtained by oxidizing an alkylbenzene in the liquid phase with a gas containing molecular oxygen in the presence of a heavy metal such as cobalt, manganese, or nickel as a catalyst and preferably in the presence of a promotor, for example, halogen such as bromine or chlorine using as a solvent a saturated aliphatic monocarboxylic acid having 2 to 4 carbon atoms such as acetic acid, propionic acid, or butyric acid, separating the resulting benzene-carboxylic acid from the reaction mixture, and then recovering the monocarboxylic acid as solvent from the mother liquor. Such residue usually contains a considerable amount of unrecovered monocarboxylic acid.

The above-mentioned liquid phase oxidation process of alkyl benzenes is known per se, as disclosed, for instance, in U.S. Pat. No. 2,833,816, British Pat. No. 798,619, and U.S. Pat. No. 3,139,452. In the present invention, the heavy metal is generally used in the form of a solvent-soluble salt, for example, salts of lower carboxylic acids such as acetic acid, propionic acid or butyric acid, naphthenates, nitrates, borates, or halides such as bromides or chlorides. Of these, salts derived from the carboxylic acids used as the solvent or the bromides are especially preferred. The gas containing molecular oxygen used as an oxidizing agent may be air or a mixed gas having a higher oxygen concentration than air, or 100% oxygen. From an economical point of view, air is most preferred.

The alkylbenzene used in the method of the invention includes, for example, monoalkylbenzenes such as methylbenzene, ethylbenzene or propylbenzene; dialkylbenzenes such as o-, m-, and p-xylenes, o-, m-, and p-ethyltoluenes, o-, m-, and p-diisopropylbenzenes; trialkylbenzenes such as 1,2,3-trimethylbenzene,1,2,4-trimethylbenzene, 1,3,5-trimethylbenzene, or various isomeric dimethylethylbenzenes; or tetraalkylbenzenes such as 1,2,4,5-tetramethylbenzene, 1,2,3,4-tetramethylbenzene, or 1,2,3,5-tetramethylbenzene. Of these alkylbenzenes, p-xylene, m-xylene, and 1,2,4-trimethyl benzene are most preferred.

According to the present invention, the extraction of the residue with water is performed by adding 0.5 – 10 parts, preferably 1–4 parts, of water per part of the residue and agitating the mixture. By this procedure, water-soluble components such as the catalyst heavy metal and iron compounds are extracted and transferred into the aqueous phase. Organic materials such as the intermediate oxidation products, or oxidation reaction by-products are dissolved in water to an extent of their solubility at the extraction temperature. Of the organic materials transferred to the aqueous phase, the tar-like substances which inhbit the oxidation reaction are usually present in amounts of about 10–30% by weight when it is calculated with the exclusion of the solvent (lower aliphatic monocarboxylic acid) present in the aqueous phase. It is impossible therefore to separate the harmful contaminants sufficiently from the catalyst component only by extraction with water. If the obtained catalystcontaining aqueous solution as such or the catalyst metal recovered from such solution is recycled to the reaction system of the liquid phase oxidation of alkylbenzenes, the reaction is inhibited due to the accumulation of iron and tar-like substances. When the amount of water used as an extractive solvent is too large, the concentration of the desired extract in the aqueous phase is dilute, and the amount of dissolved organic materials increases disadvantageously. The extraction temperature may be optional, but relatively low temperatures such as room temperature will require a longer period of time to obtain the same effect. If it is desired to complete the treatment within a short period of time, relatively high temperatures such as 90° to 100°C. should be employed. At these high temperatures, the extraction time of 2 hours or more is suitable.

The most important feature of the method of the present invention resides in the fact that after completion of the extraction of the residue with water in the manner described above, the aqueous phase is separated from a water-insoluble solid phase, and the pH of the aqueous phase is adjusted to a value of more than 5 but not exceeding 8, whereby the iron contaminant is precipitated in a form of a water-insoluble basic iron aliphatic carboxylate while maintaining the heavy metal catalyst in the aqueous phase in the dissolved state, and at the same time, the tar-like substances (of these, an especially harmful substance is considered to be a phenolic tar-like substance) are made to float in the form of oil on the surface of the aqueous solution, thus coverting both contaminants to easily removable forms. The catalyst-containing aqueous solution from which the above-mentioned precipitate and oily float have been removed can be recycled directly to the oxidation reaction without any consequent trouble.

If it is sufficient to remove only iron from the inorganic materials such as the heavy metal catalyst and iron present in the aqueous solution, the separation of iron as a basic carboxylate can be performed by rendering the aqueous solution relatively strongly acidic for example pH 5 or below. However, at such a pH, tar-like substances, especially an appreciable amount of the phenolic tar-like substances, are still dissloved in water, and in order to remove both iron and the tar-like substances thoroughly, it has been found necessary that the pH of the aqueous phase be more than 5. On the other hand, if the pH of the aqueous phase exceeds 8, the separation of iron becomes difficult, and the solubility of the tar-like substances increases; moreover, the catalytic heavy metal precipitates as a hydroxide and/or a carbonate.

In order to convert iron ions into the form of a basic iron carboxylate, the presence of carboxylic acid ions in the aqueous solution is essential. As previously stated, the residue generally contains a considerable amount of unrecovered carboxylic acid (solvent), which is transferred into the aqueous phase by the extraction of the residue with water. Therefore, the mere adjustment of the pH of the aqueous solution will permit the precipitation of iron as a basic carboxylic acid salt. The adjustment of the pH can usually be performed by adding an alkali salt such as sodium carbonate, sodium hydroxide, sodium acetate or sodium propionate. When the aqueous phase does not contain a carboxylic acid of an amount sufficient for formation of a basic iron carboxylate, the pH adjustment should be carried out with the supply of carboxylic acid ions. In such case, a mixture of sodium carbonate and acetic acid, a mixture of sodium carbonate and propionic acid, or a mixture of sodium acetate and acetic acid can be used as a pH regulator. The lower saturated monocarboxylic acid used as a solvent for the liquid phase oxidation of alkylbenzenes need not necessarily be the same type as the lower carboxylic acid in the pH regulator used for the formation of the basic iron carboxylate. The amount of pH regulator can be easily determined by preliminary experiment according to the content of iron. The aqueous solution whose pH has been adjusted may be heated to a temperature of about 50° to 60°C.

As a modification of the above-described method in the present invention, there is a preferred method wherein after the extraction of the residue, the aqueous phase separated from the solid phase is subjected to a pre-treatment to maintain its pH within the range of 4 to 5 to thereby precipitate iron in the form of basic iron carboxylate, and then the pH of the aqueous phase is adjusted to a value more than 5 but not exceeding 8 to thereby remove residual iron and the tar-like substances. This method has a merit in that the removal of iron can be performed more quantitatively.

According to another embodiment of the present invention, iron and tar-like substances are separated and removed by adjusting the pH of the aqueous phase separated from the solid phase to a value higher than 5 but not more than 8, and then the pH of the aqueous phase is re-adjusted to 4-5 to complete the precipitation of the iron.

The aqueous solution from which iron has been separated as a precipitate of a basic iron carboxylate and floating tar-like oxidation by-products have been removed in accordance with the method of the present invention contains small amounts of organic materials such as unoxidized alkylbenzene or its intermediate oxidation product besides the heavy metal used as the catalyst. These organic materials, however, do not at all adversely affect the oxidation reaction, and the aqueous solution so obtained hardly contains iron and tar-like by-products. Therefore, this aqueous solution can be recycled as a catalyst solution for the liquid phase oxidation of alkylbenzenes without any trouble. This is a superior effect of the method of the present invention. As previously stated, the liquid phase oxidation reaction of alkylbenzenes is carried out using a lower carboxylic acid having 2 to 4 carbon atoms as a solvent. Since water is formed as a by-product in the reaction system as a result of oxidation, the reaction medium in the system is a mixture of water and the lower carboxylic acid (usually containing 5 – 20% water). Therefore the catalyst-containing aqueous solution obtained according to the present invention can be directly introduced without any consequent trouble into the oxidation reaction system. However, in the event that the concentration of the catalyst in the aqueous solution is too diluted to be inexpedient, it is recommended to recycle the solution after removing water partially or substantially completely from the aqueous solution by suitable means such as evaporation.

The recovery of the catalyst according to the present invention is usually 80–95%. Therefore, at the time of re-using the catalyst, a fresh supply of catalyst to the aqueous solution to be recycled is recommended before introduction to the oxidation reaction system.

Thus, according to the present invention, harmful iron and tar-like substances can be removed simultaneously by a simple operation of adjusting the pH of an aqueous solution obtained by extracting the residue with water, and the solution remaining after removal of these contaminants can be re-used for the oxidation reaction.

Sometimes, it is desirable to recover the catalytic heavy metal as a solid from the aqueous solution instead of recycling the solution directly to the oxidation reaction system. For this purpose, an alkali carbonate such as sodium carbonate, potassium carbonate, ammonium carbonate or ammonium bicarbonate may be added to the aqueous solution from which iron and tar-like substances have been removed in accordance with the above method in order to precipitate the catalyst heavy metal in the aqueous solution in the form of the carbonate which can be subsequently separated and recovered. The carbonate of the heavy metal recovered by this procedure is in the form of a crystalline solid of high purity which contains substantially no harmful contaminants, that is, iron and oxidation by-products and can be directly recycled to the oxidation reaction system. The heavy metal carbonate may not only be a neutral carbonate, but also a double salt with ammonium carbonate or a basic carbonate. Any of these types of carbonate can be recycled without trouble. When the above-mentioned carbonate is introduced into the reaction system directly, the catalyst metal forms a soluble salt of a lower carboxylic acid used as the solvent in the reaction system. According to another method, the heavy metal carbonate may be dissolved in a lower carboxylic acid to form a solution of a carboxylic acid salt of the heavy metal, and such solution may be introduced into the oxidation reaction system either as such or in the concentrated form to an extent that the carboxylic acid salt can be isolated.

Generally, the presence of 20 ppm or more, calculated as metal, of iron in the catalyst heavy metal brings about undesirable results. According to the method of the present invention, the content of iron in the recovered catalyst heavy metal can be reduced to less than 10 ppm, and in most cases, to less than 5 ppm.

The invention will further be described by the following Examples, in which all parts are by weight unless otherwise specified.

EXAMPLE 1

A stainless steel autoclave equipped with a stirrer and a gas blow inlet at its lower part was charged with 25 parts of p-xylene, 100 parts of acetic acid, 0.1 parts of cobalt acetate tetrahydrate, 0.2 parts of manganese acetate tetrahydrate, and 0.1 parts of sodium bromide, and air was introduced into the autoclave at a rate of 0.11 mol/mol of p-xylene at 200°C., under the pressure of 40 Kg/cm$^2$ (gauge) with stirring at 2,400 r.p.m. The reaction was carried out until substantially no absorption of oxygen was observed. After completion of the reaction, the reaction mixture was withdrawn from the autoclave, and separated into a solid and liquid by centrifugation. The solid which consisted mainly of terephthalic acid was washed with glacial acetic acid. The wash liquid was combined with the liquid separated from the reaction mixture, and subjected to distillation to remove acetic acid. When there was substantially no distill-off of acetic acid, the distillation residue was withdrawn. The amount of the residue was one part.

To 2,000 parts of the residue so obtained 6,000 parts of water, were added and the mixture was stirred for 2 and half hours at 90°C. After cooling, the mixture was filtered to separate a solid phase. The extract (excepting acetic acid) in the resulting aqueous phase consisted of 25% of cobalt and manganese, 3% of iron, and 72% of organic materials excluding acetic acid. Twenty parts of acetic acid and 150 parts of anhydrous sodium carbonate were added to the aqueous phase, and the mixture was heated for 30 minutes, and allowed to stand overnight to precipitate basic iron acetate. The pH of the aqueous phase was 6.8. Tar-like substance afloat on the surface of the aqueous phase was removed, and the precipitate of basic iron acetate was separated by filtration. To the filtrate 380 parts of sodium carbonate were added to precipitate carbonates of cobalt and manganese as a mixture which was then collected by filtration. Subsequent washing and drying gave 99 parts of the carbonate. Analysis of this carbonate indicated as shown in Table 1 below that it hardly contained iron and tar-like substances.

Table 1

| Matters contained | Percentages |
| --- | --- |
| Co | 17.6% by weight |
| Mn | 28.0% by weight |
| Fe | 0.0003% by weight |
| Organic materials | not detectable |

The rate of recovery of cobalt was 92%, and that of manganese was 94%.

Comparative Example 1

In the same manner as in Example 1, 6,000 parts of water were added to 2,000 parts of the same residue as used in Example 1, and the mixture was stirred for 2.5 hours at 90°C. After cooling, a solid phase was separated by filtration. To the resulting aqueous phase 80 parts of acetic acid and 60 parts of sodium carbonate were added, and the mixture was heated for 30 minutes. The precipitation of basic iron acetate was completed in about one hour, but the tar-like by-products were hardly liberated on standing of the aqueous phase for a whole day and night. The pH of the aqueous phase was 3.6. Then, the aqueous phase was filtrated to separate the precipitate of basic iron acetate. To the filtrate 400 parts of sodium carbonate were added to precipitate the carbonates of cobalt and manganese as a mixture which was then collected by filtration. Subsequent washing and drying gave 100 parts of the carbonate. Analysis of this carbonate indicated as shown in Table 2 below that it contained a considerable amount of tar-like substances.

Table 2

| Matters contained | Percentages |
| --- | --- |
| Co | 15.5% by weight |
| Mn | 29.9% by weight |
| Fe | 0.0001% by weight |
| Organic materials | 0.6% by weight |

EXAMPLE 2

Water (4,000 parts) was added with 1,000 parts of the same residue as used in Example 1, and the mixture was stirred for 2 hours at 60°C. After cooling, a solid phase was separated by filtration. The extract in the aqueous phase consisted of 20% of cobalt and manganese, 1.5% of iron, and 78.5% of organic materials excluding acetic acid. Ten parts of acetic acid and 80 parts of sodium carbonate were added to the aqueous phase, and the mixture was heated for 30 minutes and then allowed to stand for 5 hours to precipitate basic iron acetate. The pH of the aqueous phase was 7.6. After removal of tar-like substances afloat on the surface of the aqueous phase, the precipitate of basic iron acetate was separated by filtration. Sodium carbonate (180 parts) was added to the filtrate to precipitate the carbonates of cobalt and manganese. The amount of the recovered carbonate was 48 parts. Analysis of this carbonate indicated as shown in Table 3 below that it contained only negligible amounts of iron and tar-like substances.

Table 3

| Matters contained | Percentages |
| --- | --- |
| Co | 17.2% by weight |
| Mn | 28.3% by weight |
| Fe | 0.0005% by weight |
| Organic materials | not detectable |

EXAMPLE 3

In the same way as set forth in Example 1, p-diisopropylbenzene was oxidized with air using acetic acid as a solvent and acetates of cobalt and maganese and sodium bromide as a catalyst. The resulting terephthalic acid was separated from the reaction mixture, and acetic acid was recovered from the mother liquor by distillation. To 2,000 parts of the so-obtained residue 6,000 parts of water were added, and the mixture was stirred for 2 hours at 90°C. After cooling, the mixture was separated into an aqueous phase and a solid phase by filtration. The extract in the aqueous phase consisted of 27% of cobalt and manganese, 3% of iron, and 70% of organic materials excluding acetic acid. Sodium acetate (120 parts) was added to this aqueous phase, and the mixture was heated for 30 minutes at 50°C. The mixture was allowed to stand overnight to precipitate basic iron acetate. The pH of the aqueous phase was 6.6. After removal of tar-like substances afloat on the surface of the aqueous phase, the precipitate of basic iron acetate was separated by filtration. Sodium carbonate (300 parts) was added to the filtrate to precipitate the carbonates of cobalt and manganese in an amount of 107 parts. Analysis of this carbonate indicated as shown in Table 4 below that it hardly contained iron and organic materials. The recovery of cobalt was 94%, and that of manganese was 96%.

Table 4

| Matters contained | Percentages |
| --- | --- |
| Co | 14.2% by weight |
| Mn | 30.7% by weight |
| Fe | 0.0004% by weight |
| Organic materials | not detectable |

Comparative Example 2

To 2,000 parts of the same residue as used in Example 4 6,000 parts of water were added, and the mixture was stirred for 2 hours at 90°C. After cooling, a solid phase was removed by filtration, and 40 parts of acetic acid and 30 parts of sodium acetate were added to the separated aqueous phase, after which the mixture was heated for 30 minutes. The precipitation of basic iron acetate was completed in about one hour, but the tar-like substances were hardly liberated on standing of the aqueous phase for a whole day and night. The pH of the aqueous phase was 3.5. Then, the aqueous phase was filtered to separate the precipitate of basic iron acetate. To the filtrate 360 parts of sodium carbonate were added to precipitate the carbonates of cobalt and manganese in an amount of 109 parts. Analysis of the carbonate indicated as shown in Table 5 that iron was sufficiently removed, but considerable amounts of organic materials were present.

Table 5

| Matters contained | Percentages |
|---|---|
| Co | 14.1% by weight |
| Mn | 30.9% by weight |
| Fe | 0.0001% by weight |
| Organic materials | 0.8% by weight |

EXAMPLE 4

In the same way as set forth in Example 1, m-xylene was air oxidized using acetic acid as a solvent and acetates of cobalt and manganese and sodium bromide as a catalyst. The resulting isophthalic acid was separated from the reaction mixture, and acetic acid was recovered from the mother liquor by distillation. To 1,000 parts of the residue thus obtained 4,000 parts of water were added, and the mixture was stirred for 3 hours at 60°C. After cooling, a solid phase was separated by filtration. The extract in the aqueous phase consisted of 22% of cobalt and manganese, 3% of iron, and 75% of organic materials excluding acetic acid. To the aqueous phase 10 parts of acetic acid and 70 parts of sodium acetate were added, and the mixture was heated at 50°C. for 30 minutes and allowed to stand overnight to precipitate basic iron acetate. The pH of the aqueous phase was 7.2. Tar-like substances afloat on the surface of the aqueous phase were removed, and the precipitate of basic iron acetate was separated by filtration. Sodium carbonate (190 parts) was added to the filtrate to precipitate the carbonates of cobalt and manganese in an amount of 51 parts. Analysis of this carbonate indicated as shown in Table 6 that it hardly contained iron and organic materials.

Table 6

| Matters contained | Percentages |
|---|---|
| Co | 13.9% by weight |
| Mn | 31.1% by weight |
| Fe | 0.0002% by weight |
| Organic materials | not detectable |

EXAMPLE 5

In the same way as set forth in Example 1, p-xylene was air oxidized and the residue was obtained. To 2,000 parts of the residue 6,000 parts of water were added, and the mixture was stirred at 90°C for 2.5 hours. After cooling, a solid phase was separated by filtration. The extract in the aqueous phase consisted of 25% of cobalt and manganese, 3% of iron, and 72% of organic materials excluding acetic acid. To the aqueous phase 10 parts of acetic acid and 100 parts of sodium acetate were added, and the mixture was heated at 50°C. for 30 minutes and allowed to stand overnight to precipitate basic iron acetate. The pH of the aqueous phase was 6.1. Tar-like substances afloat on the surface of the aqueous phase were removed, and the precipitate of basic iron acetate was separated by filtration. The filtrate was heated to evaporate water, and was thus concentrated to 1/20. Analysis of the resulting catalyst-containing aqueous solution (cobalt and manganese being present as acetates) indicated as shown in Table 7 that it hardly contained iron and tar-like substance, and was of a quality capable of being recycled directly to the oxidation reaction system. The recovery of cobalt was 94%, and that of manganese was 96%.

Table 7

| Matters contained | Percentages |
|---|---|
| Co | 4.7% by weight |
| Mn | 9.3% by weight |
| Fe | 0.0001% by weight |
| Tar-like organic materials | not detectable |

Comparative Example 3

To 2,000 parts of the same residue as used in Example 1 6,000 parts of water were added, and the mixture was stirred for 2.5 hours at 90°C. After cooling, a solid phase was removed by filtration. To the separated aqueous phase 10 parts of acetic acid and 20 parts of sodium acetate were added, and the mixture was heated for 30 minutes at 50°C. The precipitation of basic iron acetate was completed in about one hour. When the aqueous phase was allowed to stand overnight, tar-like substances were hardly liberated. The pH of the aqueous phase was 3.1. The aqueous phase was then filtrered to separate basic iron acetate. The filtrate was heated, and concentrated to 1/20. Analysis of the resulting catalyst-containing aqueous solution indicated as shown in Table 8 that it contained large amounts of tar-like substances and was unsuitable for use as an oxidation catalyst.

Table 8

| Matters contained | Percentages |
|---|---|
| Co | 4.6% by weight |
| Mn | 9.4% by weight |
| Fe | less than 0.0001% by weight |
| Tar-like organic materials | 1.9% by weight |

Note: Co and Mn existed in the aqueous solution as acetates.

EXAMPLE 6

Sodium acetate (60 parts) was added to the aqueous phase separated from the solid phase obtained by extraction of the residue with water in Example 5, and the mixture was heated at 50°C. for 30 minutes. The mixture was allowed to stand overnight to precipitate basic iron acetate. The pH of the aqueous phase was 6.8. Tar-like substances afloat on the surface of the aqueous phase were removed, and the precipitate of basic iron acetate was separated by filtration. The filtrate was heated, and concentrated to 1/10. Analysis of the resulting catalyst-containing aqueous solution indicated as shown in Table 9 that it hardly contained iron and tar-like substances and was of a quality capable of being recycled directly to the oxidation reaction. The recovery of cobalt was 93%, and that of manganese was 96%.

Table 9

| Matters contained | Percentages |
| --- | --- |
| Co | 2.3% by weight |
| Mn | 4.6% by weight |
| Fe | 0.0001% by weight |
| Tar-like organic materials | not detectable |

Note: Co and Mn existed in the aqueous solution as acetates.

EXAMPLE 7

To 2,000 parts of the same residue as used in Example 1 6,000 parts of water were added, and the mixture was stirred at 90°C. for 2.5 hours. After cooling, the mixture was separated into a solid phase and an aqueous phase by filtration. The aqueous phase contained 50 parts of heavy metals, 4 parts of iron, and 150 parts of organic materials other than acetic acid. To the aqueous phase 60 parts of acetic acid and 100 parts of anhydrous sodium carbonate were added to adjust the pH of the aqueous phase to 4.2. The mixture was heated at 50°C. for 30 minutes, and allowed to stand for 4 hours at room temperature. The resultant precipitate of basic iron acetate was separated by filtration. To the aqueous phase 50 parts of sodium carbonate and 5 parts of sodium hydroxide were added, and the mixture was stirred, and allowed to stand for 2 hours at room temperature. The pH of the aqueous phase was 6.8. The formation of the precipitate of basic iron acetate was substantially not observed, but there was a marked liberation of tar-like substances. Tar-like substances afloat on the surface of the aqueous phase were removed, and thereafter 380 parts of sodium carbonate were added to the aqueous phase to precipitate the mixed carbonate of cobalt and manganese, which was then collected by filtration. The carbonate was washed with water, and dried. Analysis of the carbonate indicated as shown in Table 10 below that iron and tar-like substances were almost completely removed within a short period of time.

Table 10

| Matters contained | Percentages |
| --- | --- |
| Co | 17.6% by weight |
| Mn | 28.0% by weight |
| Fe | 0.0001% by weight |
| Organic materials | not detectable |

EXAMPLE 8

To 1,000 parts of the same residue as used in Example 1 4,000 parts of water were added, and the mixture was stirred for 2 hours at 60°C. After cooling, a solid phase was removed by filtration. The extract in the aqueous phase consisted of 20% of cobalt and manganese, 1.5% of iron, and 78.5% of organic materials excluding acetic acid. To the aqueous phase 10 parts of acetic acid and 80 parts of sodium carbonate were added, and the mixture was stirred and allowed to stand for 2 hours at room temperature. The pH of the aqueous phase was 7.6. Tar-like substances afloat on the surface of the aqueous phase were removed, and 100 parts of acetic acid were added to the aqueous phase to adjust its pH to 4.3. The mixture was heated at 50°C. for 30 minutes, and allowed to stand for 5 hours at room temperature. The resultant precipitate of basic iron acetate was separated by filtration, and then 250 parts of sodium carbonate were added to the aqueous phase to precipitate the carbonates of cobalt and manganese, which were then recovered. The amount of the carbonates obtained was 48 parts. Analysis of the carbonates indicated as shown in Table 11 that iron and tar-like substances were almost completely removed.

Table 11

| Matters contained | Percentages |
| --- | --- |
| Co | 17.2% by weight |
| Mn | 28.3% by weight |
| Fe | 0.0001% by weight |
| Organic materials | not detectable |

What is claimed is:

1. A method of removing iron and tar-like by-products from the residue containing a heavy metal oxidation catalyst, said residue being derived by separating the formed benzene carboxylic acid and then recovering a solvent from the reaction mixture resulting from the liquid phase oxidation of an alkyl benzene with a molecular oxygen-containing gas using a heavy metal oxidation catalyst in the presence of a saturated lower aliphatic monocarboxylic acid having 2 to 4 carbon atoms as a solvent, wherein the reaction mixture is contaminated by iron and tar-like oxidation by-products which act as inhibitors for the oxidation reaction, said method comprising the steps of: subjecting said residue to extraction with water; separating the catalyst-containing aqueous phase from the so-treated water-insoluble residue, adding an alkali salt of a saturated lower aliphatic monocarboxylic acid plus a saturated lower aliphatic monocarboxylic acid to the aqueous phase to regulate the pH of the aqueous phase to a value more than 5 but not exceeding 8 to thereby separate the tar-like by-products as an oily float and iron as a precipitate of basic iron carboxylate; and removing said oily float and said precipitate from the aqueous phase.

2. The method of claim 1, wherein after separating the oily float and the precipitate from the aqueous phase, an alkali carbonate is added to the aqueous phase to separate and recover the catalyst heavy metal as a precipitate of carbonate.

3. The method of claim 1, wherein the separated aqueous phase is subjected to pre-treatment to maintain its pH within the range of 4 to 5 to thereby precipitate iron as a basic iron carboxylate and then the pH of the aqueous phase is adjusted to a value more than 5 but not exceeding 8.

4. The method of claim 3, wherein after removing the oily float and the precipitate from the aqueous phase, an alkali carbonate is added to the aqueous phase to thereby separate and recover the catalyst heavy metal as a precipitate of carbonate.

5. The method of claim 1, wherein the pH of the aqueous phase is adjusted to a value more than 5 but not exceeding 8 to thereby separate the tar-like oxidation by-products and iron from the aqueous phase, and then the pH of the aqueous phase is re-adjusted to 4-5, to thereby promote the precipitation of iron.

6. The method of claim 5, wherein after removing iron and tar-like by-products from the aqueous phase, an alkali carbonate is added to the aqueous phase to thereby separate and recover the catalyst heavy metal as a precipitate of carbonate.

* * * * *